No. 620,530. Patented Feb. 28, 1899.
W. E., W. H. & H. E. AYKROYD.
APPARATUS FOR MERCERIZING.
(Application filed Oct. 3, 1898.)

(No Model.) 6 Sheets—Sheet 1.

Witnesses
Inventors

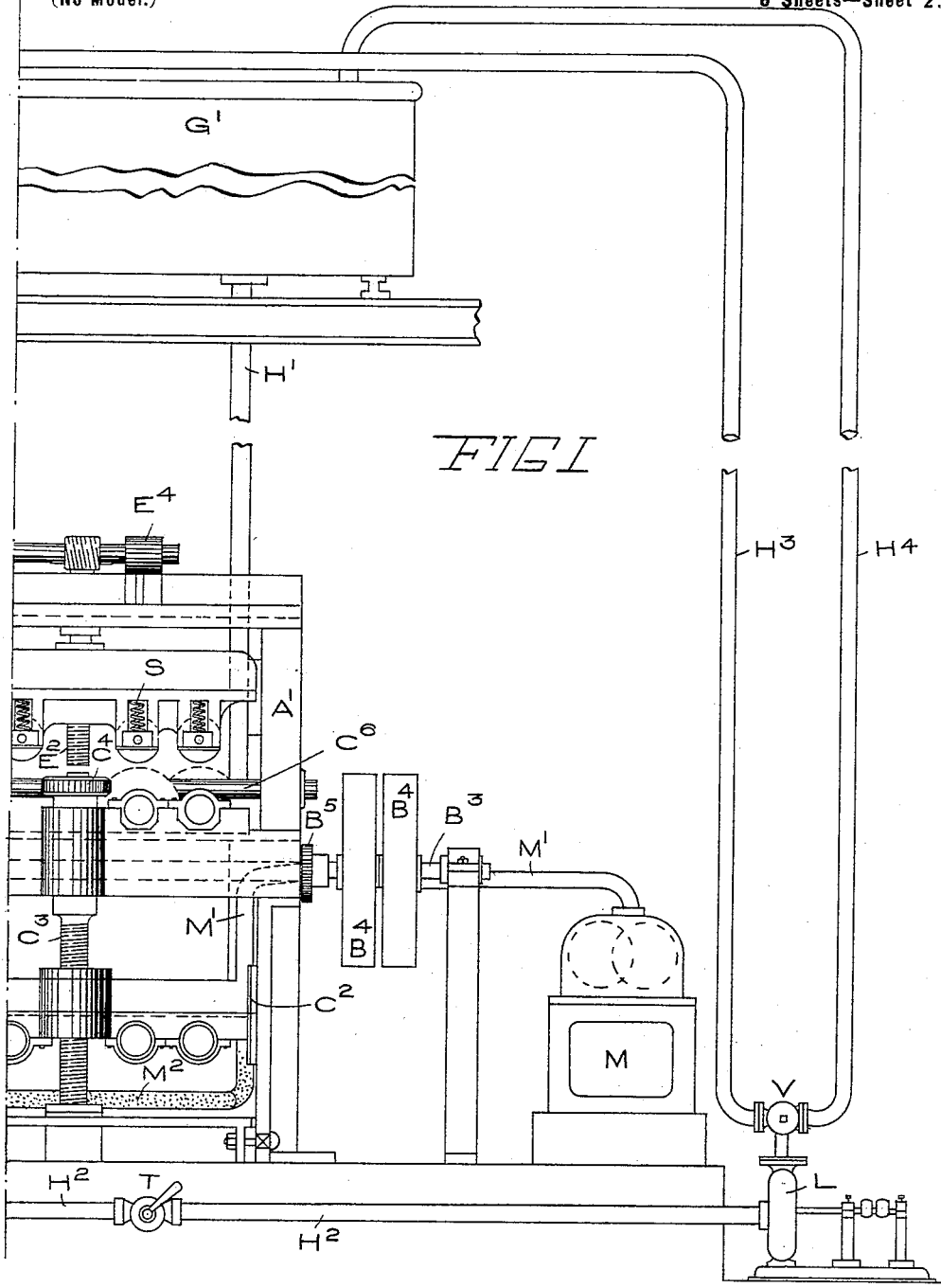

No. 620,530. Patented Feb. 28, 1899.
W. E., W. H. & H. E. AYKROYD.
APPARATUS FOR MERCERIZING.
(Application filed Oct. 3, 1898.)

(No Model.) 6 Sheets—Sheet 3.

Witnesses
Inventors

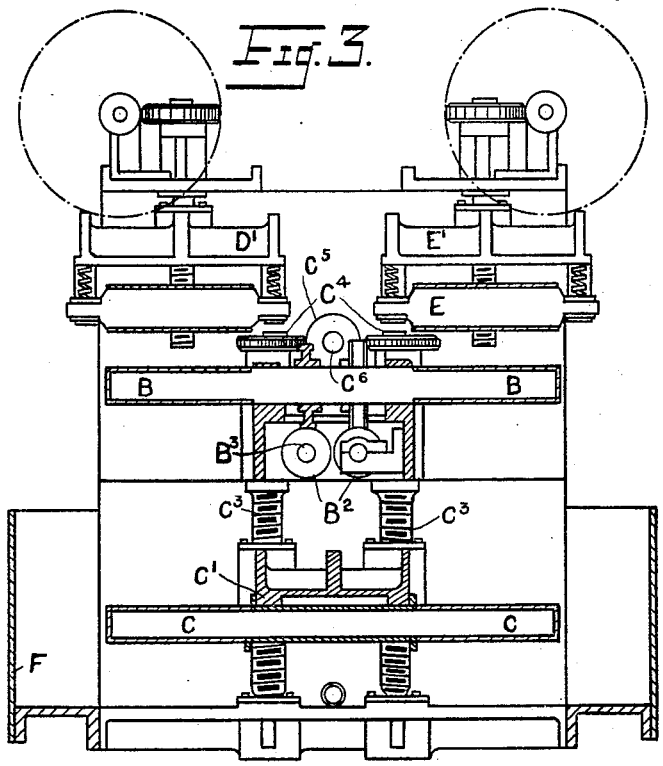
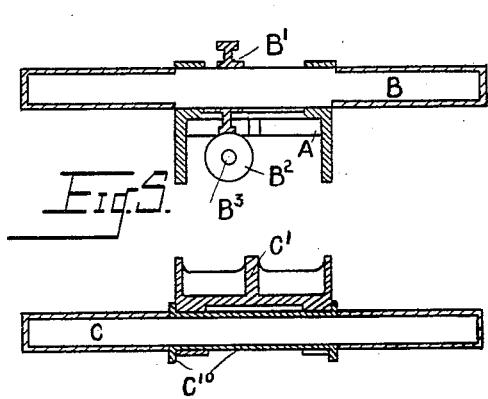
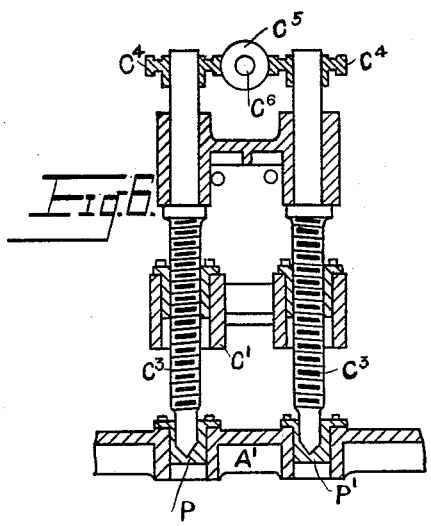

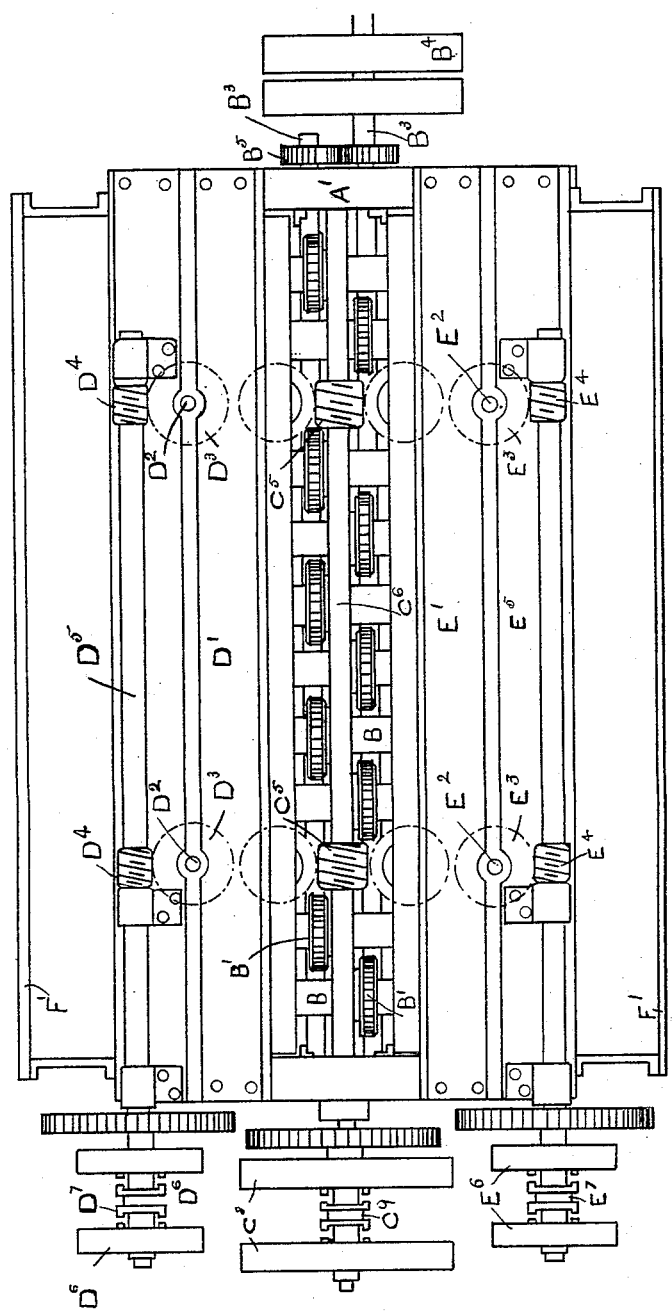

No. 620,530. Patented Feb. 28, 1899.
W. E., W. H. & H. E. AYKROYD.
APPARATUS FOR MERCERIZING.
(Application filed Oct. 3, 1898.)
(No Model.) 6 Sheets—Sheet 6.
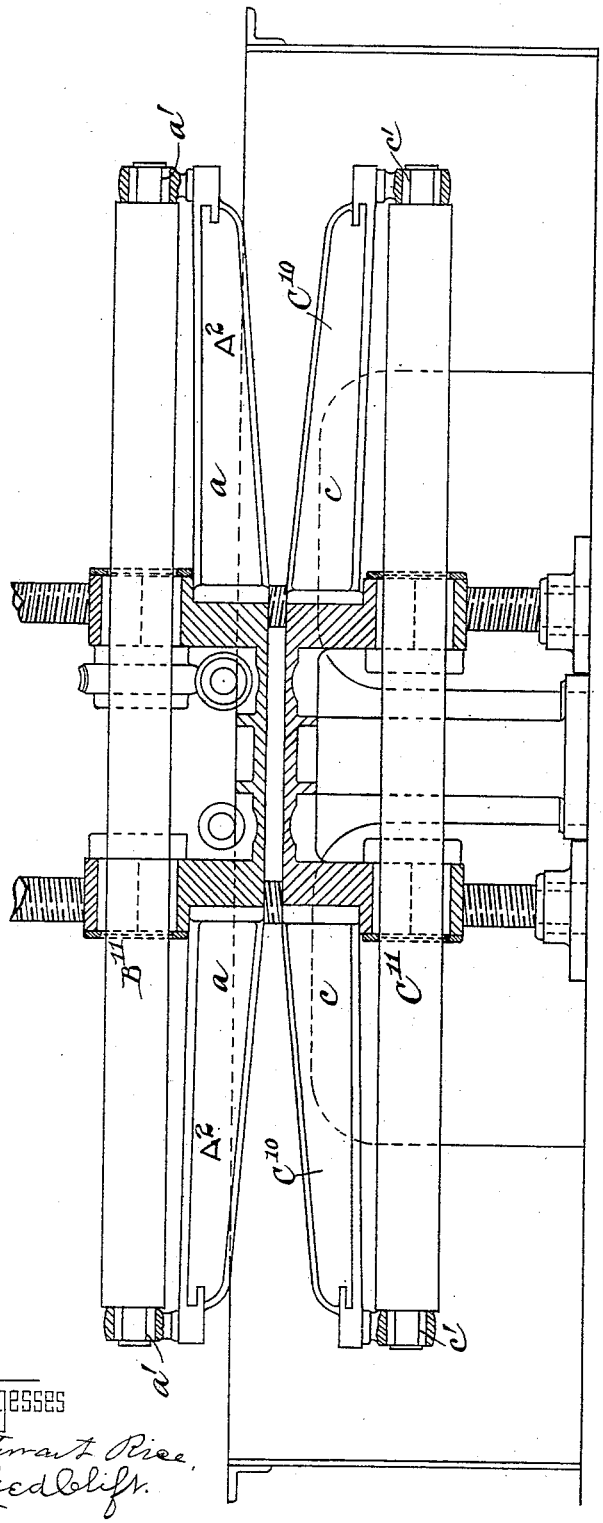

UNITED STATES PATENT OFFICE.

WILLIAM EDWARD AYKROYD, WILLIAM HENRY AYKROYD, AND HENRY EDWARD AYKROYD, OF BRADFORD, ENGLAND.

APPARATUS FOR MERCERIZING.

SPECIFICATION forming part of Letters Patent No. 620,530, dated February 28, 1899.

Application filed October 3, 1898. Serial No. 692,548. (No model.)

*To all whom it may concern:*

Be it known that we, WILLIAM EDWARD AYKROYD, WILLIAM HENRY AYKROYD, and HENRY EDWARD AYKROYD, subjects of the Queen of Great Britain, residing at Bradford, in the county of York, England, have invented certain new and useful Improvements in Apparatus for the Mercerization of Fibrous Materials, of which the following is a specification.

This invention relates to improvements in machines for the mercerization of fibrous materials, and is designed for the imparting of a silky luster and touch to yarn or fibrous substances while being stretched under pressure.

The invention consists in a machine having a convenient number of pairs of squeezing-rollers at the top of the machine and a similar number of single rollers running parallel to the said squeezing-rollers at the bottom.

It also consists of certain other novel constructions, combinations, and arrangements of parts, as will be hereinafter fully described and claimed.

Figure 1:
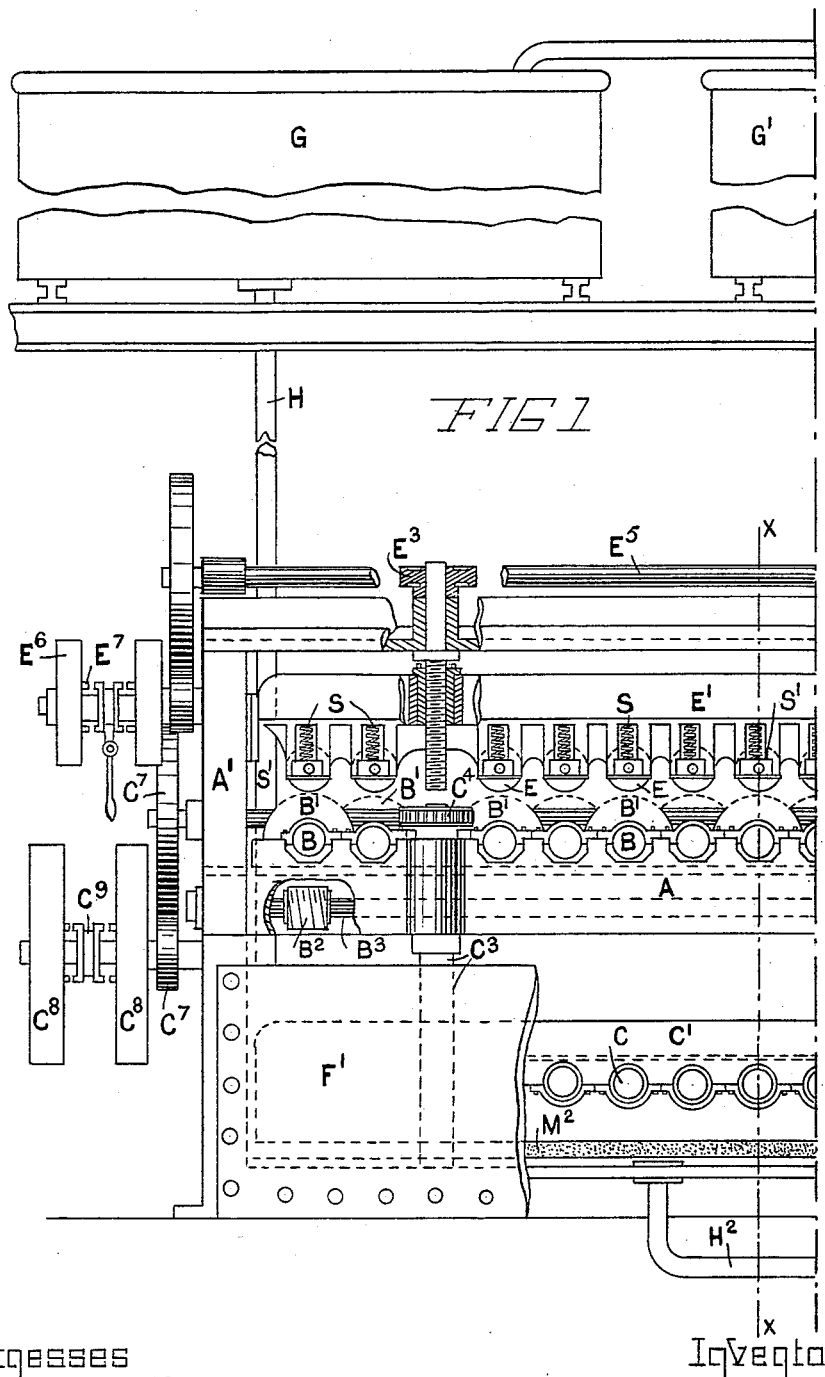
Figure 2:
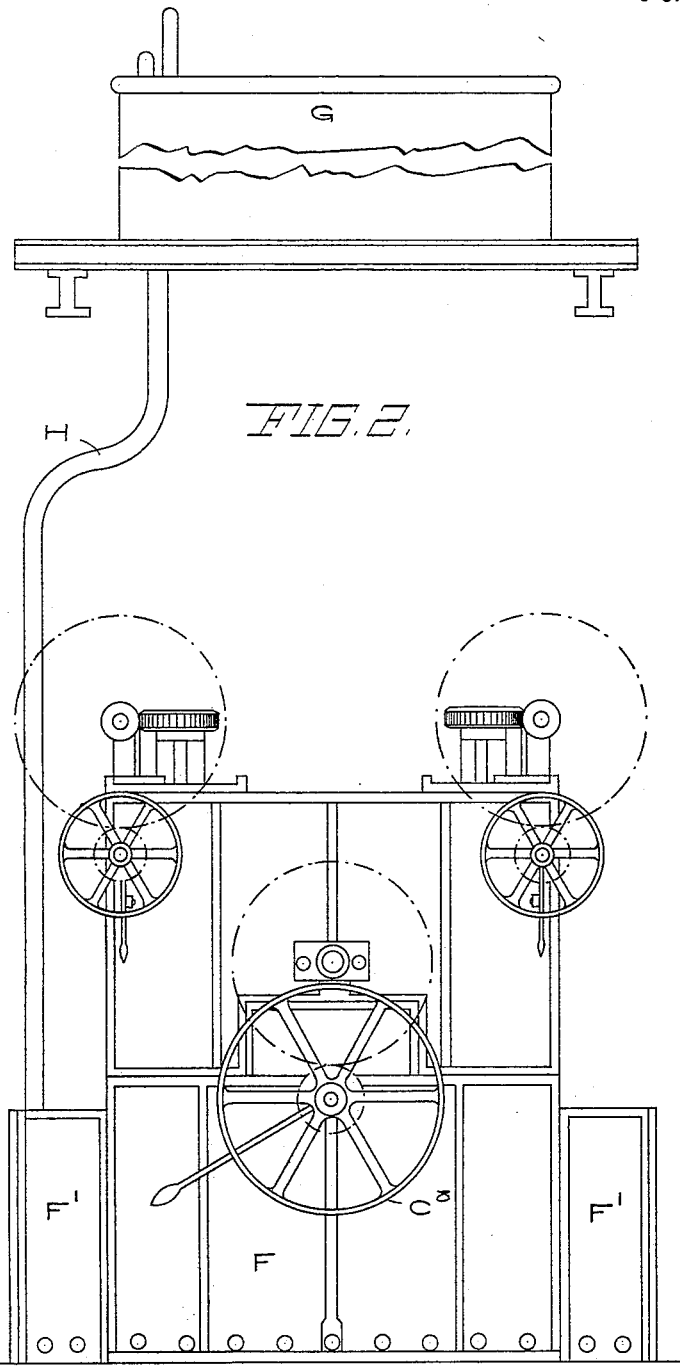

In the accompanying drawings, Figures 1 and 1$^a$ represent, when taken together, a side elevation of the entire machine, with reservoir-tanks for the mercerizing liquid above, certain portions of which are partially cut away in order to more clearly show these parts at the back. Fig. 2 is an end elevation of same. Fig. 3 is a vertical section through the machine at $x\ y$ in Fig. 1. Fig. 4 is a plan of the entire machine with the supply-tanks cut away. Fig. 5 is a more detailed sectional view through a pair of the rolls shown in Fig. 3 utilized for immersing the fibrous material in the mercerizing liquor. Fig. 6 is a more detailed view of sundry other parts shown in Fig. 3, and Fig. 7 a detail view of the rollers supplied with arm-supports.

In the drawings, A represents a fixed girder carrying rollers B B.

C C are lower rollers for passing the material through the mercerizing liquid, and D D and E E are squeeze-rollers.

The required pressure for stretching the yarn or fibrous material is obtained by the use of four or more screws fixed vertically in pairs, said screws being actuated by worm-wheels, worms, shaft, and hand or power driven wheels or other similar devices, as will be hereinafter more fully described. The squeezing-rollers are engaged or disengaged in like manner to the stretching-rollers— namely, by the use of four or more screws actuated by worm-wheels, worms, shaft, and hand or power driven wheel or similar device. The rollers in the fixed girder are revolved by the use of worm-shafts with separate worms and worm-wheels, the whole to be revolved by power belt driven or otherwise. The whole operating mechanism is mounted over an open cistern or tank wherein the mercerizing agent or agents, such as strong caustic or acid or any other mercerizing agent, may be placed or displaced at will by the use of rotatory pump or pumps, ejectors, or similar devices accompanied by the use of taps, valves, or sluices and suitable connections. The liquid mercerizing agent or agents are preferably agitated by air, which may be blown in in a continuous or intermittent stream, or by any mechanical device suitable for the purpose—such, for instance, as revolving fans within the liquid or inverted cones, &c.

In embodying the invention in a practical form, A is a girder fixed in and borne by the main frame A' and accurately machined out to carry a greater or less number of strong steel rollers, which are covered with specially-prepared acid-proof sheaths, such as ebonite, india-rubber, phosphor-bronze, or other acid-resisting substance. B B are said specially-covered rollers journaled for rotation in said fixed girder A. B' B' are worm-wheels keyed alternately to either side of the center of the steel rollers B and are driven by worms $B^2$, keyed to the two parallel shafts $B^3$, which run throughout the length of the machine. One of these shafts is driven from a pair of fast and loose pulleys $B^4$, the other shaft being driven by means of intermediate gearing $B^5$ between the two shafts. By this means the two shafts, together with their respective worm-gearing, are run in opposite directions, an equal thrust being thus imparted to each end of the frame instead of one end of the frame bearing the entire thrust of both shafts. C C is a similar series of rollers operated by the friction of the material passing around them and carried in a movable girder C', working in guides C² at either end and raised or lowered by means of four screws, (lettered C³,) two at either end of the girder. These screws have worm-wheels C⁴ keyed onto their upper ends, which engage with two worms C⁵, one at each end of a central shaft C⁶, driven by gearing and pulleys, (marked, respectively, C⁷ and C⁸.) The pulleys C⁸ may be reversed in their motion whenever needful by means of the double clutch C⁹, and in this way the raising or lowering of the girder C, with its accompanying rollers, may be effected. The desired tension on the material running upon the two series of rollers B B and C C is thus determined to a fine degree. Another series of rolls of larger diameter (marked D and E) are provided for giving a certain amount of "nip" or squeezing action to the material as it passes over the top series of rollers B B. These are carried upon two girders D' and E', placed in the upper part of the machine, which have a vertical motion in guides attached at each end to the main frame of the machine. Motion is imparted to these two girders independently by two sets of screws E² and D², respectively. These screws are worked similarly to those operating the bottom girder by means of worm-wheels and worms (marked, respectively, D³ D⁴ and E³ E⁴) and two shafts D⁵ E⁵, receiving motion from the reversible pulleys D⁶ E⁶, operated by double clutches D⁷ E⁷. On the top of each of the pressure-rollers D D and E E, carried by girders D' and E', will be seen a spring S, placed between the vertically-movable bearing-blocks S', in which the rollers run, and the girders D' and E', as seen in Fig. 1. These springs provide and give a resilience or elasticity to the pressure placed upon the material as it passes through the machine and act as a preventive against undue pressure being put upon such material. It will thus be seen that there are four entirely independent systems of motion in the machine described—namely, the bottom movable girder with its operative screws and worm-gearing, the main central girder fixed rigidly to the frame and carrying rollers driven also by worm-gearing, and the two upper girders with their respective screws, and worm-gearing for lowering or elevating the rolls carried thereon to or from the rollers carrying the material.

F is an open tank lined throughout with copper in order to resist the action of the liquor and upon which the whole machine is rigidly fixed, the ends of said tank forming the supports for the central fixed girder A. Two wings or extensions F' of the tank are provided at either side, extending upward for half the height, thus facilitating the placing of the material upon the rollers at the bottom. In this tank F is the mercerizing liquor, which is run in from two or more reservoir-tanks G G, placed above the machine and connected thereto by supply-pipes H H'.

A waste-pipe H² carries away the liquor when the mercerizing operation is complete. This pipe is connected to a centrifugal or other pump L, whereby the liquor running to waste may be pumped up into the reservoir-tanks, a suitable multiple-way valve V being provided, so that the liquor can be directed at will into one or other of the reservoir-tanks through pipes H³ H⁴. By this means the reservoir-tanks may be arranged to contain different liquors—such as strong acid and strong caustic, &c.—and the used liquor can be returned to its own respective reservoir-tank.

M is a fan or other suitable blower for supplying air under pressure through pipe M' to the perforated tube M², laid along or near the bottom of the liquor-tank F, the compressed air being forced out through the perforations into the surrounding liquor. The object of this is to provide an efficient agitator and at the same time to afford a means for the thorough oxidation of the mercerizing liquor.

T is a two-way tap placed in the waste-pipe for purposes explained hereinafter.

In Fig. 5 is clearly shown one complete set of rollers B and C for carrying the material during its mercerization; also, the upper and lower girders A and C, respectively, and the worm-wheel B, to one side of the center, working onto its worm B², which is keyed on the shaft B³. The rollers are carried in bushes of soft metal, shown clearly in the case of the lower set C at C¹⁰.

By reference to Fig. 6 the screws for raising and lowering the bottom series of rollers C and their method of operation may be better understood. The screws C³ are stepped at their bottom end in conical "footstep-bearings" P P' in the main frame A'. They have right and left handed threads cut upon them in order that when revolving in opposite directions may yet act in combination to raise or lower the girder C'. To their upper ends are keyed the two worm-wheels C⁴, operated by the one worm C⁵ on the shaft C⁶. This will cause the worm-wheels to turn in opposite directions, which is compensated for by the right and left handed threads of screws C³, referred to above.

The method of operating the machine is as follows: The hanks of yarn, cotton, &c., are placed over the top rollers B and then slipped under the bottom ones C and the machine started by switching the belt from loose pulley to fast pulley at B⁴. The liquor is next run in until sufficient to cover the lower series of rollers C. At this point the material undergoes considerable shrinkage, causing such tension between the two sets of rollers as to necessitate their being constructed of great strength. If necessary, the double clutch C⁹ is operated to adjust the tension upon the material by raising or lowering the girder C' in the manner previously explained. The clutches D⁷ and E⁷ may also be operated, lowering the nip-rolls D D and E E to give any desired squeezing action to the material. As soon as the liquor has been run in the fan or blower M is started, setting up the agitation and oxidation of the liquor through the perforated pipe $M^2$. The process then continues until the mercerization of the material is completed. At this point the two-way valve-tap T, mentioned above, is opened to the waste-pipe $H^2$ and centrifugal pump L, causing the liquor to be pumped back again into its reservoir-tank. As soon as the tank is empty the valve-tap T is again closed and the clean water run into the tank. After the material has been passed through the water for a short time the rinsing-water is run to waste through the valve-tap T being turned to waste. The rinsing is repeated with more clean water, and the whole process is then complete, and the material may be removed from the machine.

While the above is a description in general of our machine, we do not in any way limit ourselves to the precise details set forth, but the construction may be varied somewhat without departing from the spirit of the invention. Thus it might be found desirable to apply the nip-rolls to the bottom series of rollers either alone or in conjunction with those applied to the upper series of rollers. They may also be arranged so that the nip or pressure may be applied separately to each roller or collectively to the entire series at once. Again, in place of the screw and worm-gearing for lowering and raising the three various movable girders hydraulic rams might be used if found more advantageous, or a system of screws and toggle-joints. Also the nip or pressure might be applied by one large roll between each two of the rollers carrying the material instead of by a separate roll above each of the small rollers. The agitation may also be effected, if needful, by fans or inverted cones rotated in the liquor.

Owing to the shrinkage which the material undergoes causing great tension between the two sets of rollers we sometimes provide the arm-supports depicted in Fig. 7. In this figure $A^2$ is the fixed girder, and $C^{10}$ the movable girder, in which the rollers $B^{11}$ and $C^{11}$ are journaled near the center. Each of these girders is provided with a series of lateral arms $a$ and $c$ on each side, with bearings $a'$ and $c'$ at the end, in which the ends of the rollers $B^{11}$ and $C^{11}$ are journaled. This construction therefore very effectively resists the great tension between the two sets of rolls caused by the shrinkage of the material.

Having now described our invention, what we claim as new, and desire to secure by Letters Patent, is—

1. In a machine for mercerizing fibrous materials, the combination of a series of parallel horizontal rollers for carrying and stretching the material, means for adjustably supporting the said stretching or carrying rollers centrally of their length, whereby their ends are free to receive and discharge the material, a series of pressure-rollers adjacent to the carrying-rollers, and means for adjusting the said pressure-rollers comprising a series of screws and worm-gearing for operating all of the said screws, whereby the pressure may be finely adjusted, substantially as described.

2. In a mercerizing-machine, the combination with a suitable frame, of roller-carrying girders, parallel stretching-rollers mounted upon the said girders and having journals formed upon their outer ends, means for supporting the said stretching-rollers so that their outer ends may be free to receive or discharge the mercerizing material comprising lateral arms formed upon the said girders and having journal-bearings in their ends for engaging the journals upon the ends of the said rollers, the construction being such that the tension between the two sets of rollers caused by the shrinkage of material will not spring the rollers out of true, substantially as described.

In witness whereof we have hereunto signed our names, this 21st day of September, 1898, in the presence of two subscribing witnesses.

WILLIAM EDWARD AYKROYD.
    WILLIAM HENRY AYKROYD.
    HENRY EDWARD AYKROYD.

Witnesses:
 ARROLD FOXCROFT,
 JAMES RICHARD BROOK.